United States Patent [19]

Anelli et al.

[11] Patent Number: 5,715,343
[45] Date of Patent: Feb. 3, 1998

[54] OPTICAL CABLE PROTECTED AGAINST HUMIDITY

[75] Inventors: Pietro Anelli, Milan; Claudio Bosisio, Brembate Sotto, both of Italy

[73] Assignee: Pirelli Cavi S.p.A., Milan, Italy

[21] Appl. No.: 560,345

[22] Filed: Nov. 17, 1995

[30] Foreign Application Priority Data

Nov. 24, 1994 [IT] Italy ............... MI94A2380

[51] Int. Cl.$^6$ ............................................. G02B 6/44
[52] U.S. Cl. ........................ 385/100; 385/109; 385/110; 385/112
[58] Field of Search ................ 385/100–114, 109, 385/110, 112

[56] References Cited

U.S. PATENT DOCUMENTS 4,767,184  8/1988  Ogasawara et al. ............... 385/105
5,179,611  1/1993  Umeda et al. ...................... 385/110
5,278,217  1/1994  Umeda et al. ...................... 524/394

FOREIGN PATENT DOCUMENTS

| 0466230A1 | 1/1992 | European Pat. Off. .......... G02B 6/44 |
| 464918A1 | 1/1992 | European Pat. Off. .......... G02B 6/44 |
| 0487121A1 | 5/1992 | European Pat. Off. .......... G02B 6/44 |
| 2185591 | 7/1987 | United Kingdom ............ G02B 6/44 |
| WO881000 | 12/1988 | WIPO ............................. H01B 7/28 |
| 9322696 | 11/1993 | WIPO ............................. G02B 6/44 |

*Primary Examiner*—Phan T. H. Palmer
*Attorney, Agent, or Firm*—Brooks Haidt Haffner & Delahunty

[57] ABSTRACT

Optical cable, including (a) at least a closed longitudinal housing containing at least an optical fiber and (b) an outer coating permeable to water, wherein there is a second longitudinal housing comprising a moisture-absorbing composition that after absorption of more than 50% by weight of water releases less than 5% by weight of water at 60° C. in two hours.

23 Claims, 2 Drawing Sheets

OPTICAL CABLE PROTECTED AGAINST HUMIDITY

FIELD OF THE INVENTION

This invention relates to an optical cable protected against humidity as well as a moisture-absorbing composition capable of protecting said cable against humidity.

More particularly, this invention relates to an optical cable comprising (a) at least a closed longitudinal housing containing at least an optical fiber and (b) an outer coating permeable to water, wherein said fiber is protected by a moisture-absorbing composition that, after having absorbed water, releases it very slowly when the temperature of the cable rises.

BACKGROUND

It is known that cables, be they electrical, conventional or of the optical-fiber type telephone cables, have the drawback of the possible entry of liquid water caused by discontinuities due to defects or to defective joints of the outer coating and/or, in particular in the case of submarine cables, of the external metal sheaths. The manufacturers of cables have therefore always paid a great deal of attention to the investigation of protective coatings capable of opposing the entry of liquid water into the cable.

A first solution consists in filling the cavities where the conductors or optical fibers are housed with a composition having a paste-like and viscous consistency containing a moisture-absorbing compound that swells in contact with water and forms an actual plug that prevents the further penetration of water.

A second type of solution consists instead in placing, next to the conductors or to the optical fibers, a spun thread or tape comprising a moisture-absorbing compound that swells in contact with water.

The main feature required of these known compositions is the high speed of swelling so that the penetration is reduced to a minimum.

An example of the first solution is described by WO-A-88/10000.

Examples of the second solution are instead disclosed in U.S. Pat. No. 5,278,217 and in the articles by H. Sawano et al. ("The reliability of water proof optical cable with a plastic sheath and water swellable materials" International Wire & Cable Symposium Proceedings 1991, pages 333 . 338) and by M. Fukuma et al. ("Dry type water blocking optical fiber tape cable with slotted rod" International Wire & Cable Symposium Proceedings 1987, pages 350–355).

WO-A-88/10000 discloses a mixture comprising a moisture-repellent substance and less than 10% by weight, but at least 45% by volume, of a powder-like expandable synthetic substance wherein the high swelling speed is attained by reducing the size of the particles in the swellable substance to less than 50 μm.

U.S. Pat. No. 5,278,217 discloses a moisture-absorbing spun thread comprising a thermoplastic elastomer, a moisture-absorbing resin, a hydrophilic compound and a surface-active agent. The hydrophilic compound and the surface-active agent have the aim of increasing the speed of water absorption and, thus, of swelling, thus reducing the penetration of water to a minimum. The amount of moisture-absorbing resin can vary from about 5% to about 97% by weight.

H. Sawsno et al. disclose a swellable tape consisting of, in succession, a non-woven support, an adhesive layer and a layer of moisture-absorbing polymer that, in contact with water, separates from the support and fills the cavities of the cable thus preventing the propagation of water. A similar type of cable had already been disclosed by M. Fukuma et al. According to these authors, the negative effects of water on the optical fibers would be due to hydrogen released by the contact of water with the components of the cable, particularly if made of metal.

SUMMARY OF THE INVENTION

However, it has now been found that in the case of optical fiber cables without watertight metal sheaths a chain of complex phenomena takes place that impair the optical fibers even when the outer coating is not damaged.

It has also been found that the most important negative final result is related to segregation of water between the glass fiber and its primary coating and that, under particular operating conditions, this phenomenon takes place in comparatively short periods of time in spite of the integrity of the outer coating, the absence of metal elements capable of releasing hydrogen in contact with water, and the presence of compounds that absorb water quickly.

For a better understanding of the phenomena that we have discovered, it will be remembered that an optical fiber cable substantially consists of at least a fiber of amorphous silica wrapped with a first coating of a UV cross-linked resin (primary coating) and with a second coating, also of a UV cross-linked resin (secondary coating). Typically, UV cross-linked resins used to form the primary and the secondary coatings belong to the family of the acrylic resins.

Generally, a certain number of optical fibers wrapped in this way is then made up into a bundle or embedded in a polymeric matrix to form a tape. Then the bundles or the tapes are placed in longitudinal housings usually consisting of small tubes of polymeric material or by grooves in a core of polymeric material. The gels, fibers or tapes comprising the moisture-absorbing compound are placed in close contact with said bundles or tapes within and/or round their longitudinal housing. The whole is then wrapped by at least another extruded polymeric sheath. In this description and in the claims appended hereto, the set of sheaths surrounding the longitudinal housings of the fibers is referred to as "outer coating".

The cable described just now is dielectric.

But it can also comprise reinforcing elements or metal electrical conductors, thus losing the dielectric property.

The cable can then be protected against water by a sealed and watertight metal coating. This protection is mainly used in submarine cables.

The discovery on which this invention rests refers mainly to cables without a watertight metal coating, whether they are dielectric, or not.

The first phenomenon that takes place in cables without a watertight metal coating is that the outer coating in plastic material, even though it is not damaged, is not completely impermeable to water vapour. The permeability to water vapour of the outer coating varies as its nature and its manufacturing characteristics vary. The effects caused by permeability to water vapour of the outer coating depend above all on the content of water and on the temperature of the site where the cable has been installed.

In this description and in the claims appended hereto the term "outer coating permeable to water" is used to mean a coating that has a permeability to water of from $10^{-11}$ to $10^{-6}$ g/cm/h/millibar when tested according to ASTM E96/1974 (See TEST I below).

Generally, the most commonly used coatings have a permeability to water of from $10^{-10}$ to $10^{-7}$ g/cm/h/millibar.

Typically, said outer coating consists of a sheath 0.5–3 mm thick of high density poly ethylene (HDPE), medium density poly ethylene (MDPE), low density poly ethylene (LDPE) or of poly vinyl chloride (PVC) and has a permeability to water of from $10^{-9}$ and $10^{-8}$ g/cm/h/millibar (tested with the abovementioned test).

Of course, in cables comprising a moisture-absorbing compound, water vapour that permeates the outer coating and approaches the optical fiber is captured by the moisture-absorbing compound.

We have, however, found that the known moisture-absorbing compositions absorb water quickly but they release it just as quickly when the temperature rises. This takes place mainly in those geographical areas and with those types of installation of the cable wherein it is exposed to thermal swings of 10°–15° C. between night and day.

Under these conditions the moisture-absorbing compositions of the known type quickly release water vapour that tends to saturate the inner portion of the cable.

When the relative humidity inside the cable exceeds about 75–80% water vapour causes the partial delamination of the primary coating of the optical fiber and this attenuates the signal transmitted through the fiber.

Departing from the abovementioned discoveries, this invention aims to set up a moisture-absorbing composition that, in addition to absorbing water vapour that penetrates through a not damaged outer coating and to effectively preventing the propagation of liquid water inside the cable when a discontinuity of the outer coating takes place, is also capable of releasing water vapour slowly when the temperature of the cable rises in order to control the humidity level inside the longitudinal housing of the fiber and thus to avoid the drawbacks mentioned above.

Therefore, it is a first object of this invention provide an optical cable, comprising (a) at least a closed longitudinal housing containing at least an optical fiber and (b) an outer coating permeable to water vapour, characterized in that it comprises a second longitudinal housing comprising a moisture-absorbing composition that after absorption of more than 50% by weight of water releases less than 5% by weight of water at 60° C. in two hours.

Preferably, the second housing is placed between said first longitudinal housing and said outer coating.

Moreover, it is a further object of this invention to provide a moisture-absorbing composition that after absorption of more than 50% by weight of water releases less than 5% by weight of water at 60° C. in two hours.

The moisture-absorbing composition of this invention comprises from 45 to 60% by weight of a fluid hydrophobic compound (Component A) and from 40 to 55% of a moisture-absorbing compound (Component B).

When the amount of Component B is 60% or more, the viscosity of the moisture-absorbing composition tends to be too high and both its production and its application to the cable become difficult.

In contrast, when the amount of Component B is 35% or less, the moisture-absorbing composition is more permeable to vapour.

When Component A is an unsaturated compound, the Composition of this invention may comprise a catalyst (Component D) capable of promoting the absorption of hydrogen gas by Component A. In this latter case, the moisture-absorbing Composition of this invention protects the optical fibers from hydrogen gas as well.

Component A is preferably selected from the group comprising saturated and unsaturated polyolefins having a molecular weight average number of from 200 to 3,000, saturated and unsaturated polysiloxanes having a molecular weight average number of from 1,000 to 10,000, polyhydric alcohols such as, for example, PEG 20, aliphatic, aromatic and naphthenic hydrocarbon oils whose viscosity is of from 50 to 30,000 centistokes, liquid esters such as dioctyl phthalate, liquid polyesters, and animal and vegetable oils.

Typical examples of Component A are polyisobutylene having a molecular weight of from 300 to 2,000, polybutadiene and optionally vinyl-terminated polydimethylsiloxane.

Component B is selected from the compounds known for their ability to gel when they absorb water. Preferably they must be capable of absorbing at least 100% of water when exposed in a saturated environment at room temperature.

Typical examples of Component B are sodium polyacrylate and polymethacrylate.

Preferably Component C consists of pyrogenic silica.

Component D is preferably selected from the derivatives of the noble metals known for their ability to catalyze hydrogenation reactions. A typical example of these compounds is palladium metal on activated charcoal.

BRIEF DESCRIPTION OF THE DRAWINGS

The invention will now be described with reference to the enclosed FIGS. 1 and 2, where.

DESCRIPTION OF THE PREFERRED EMBODIMENTS

Figure 1:
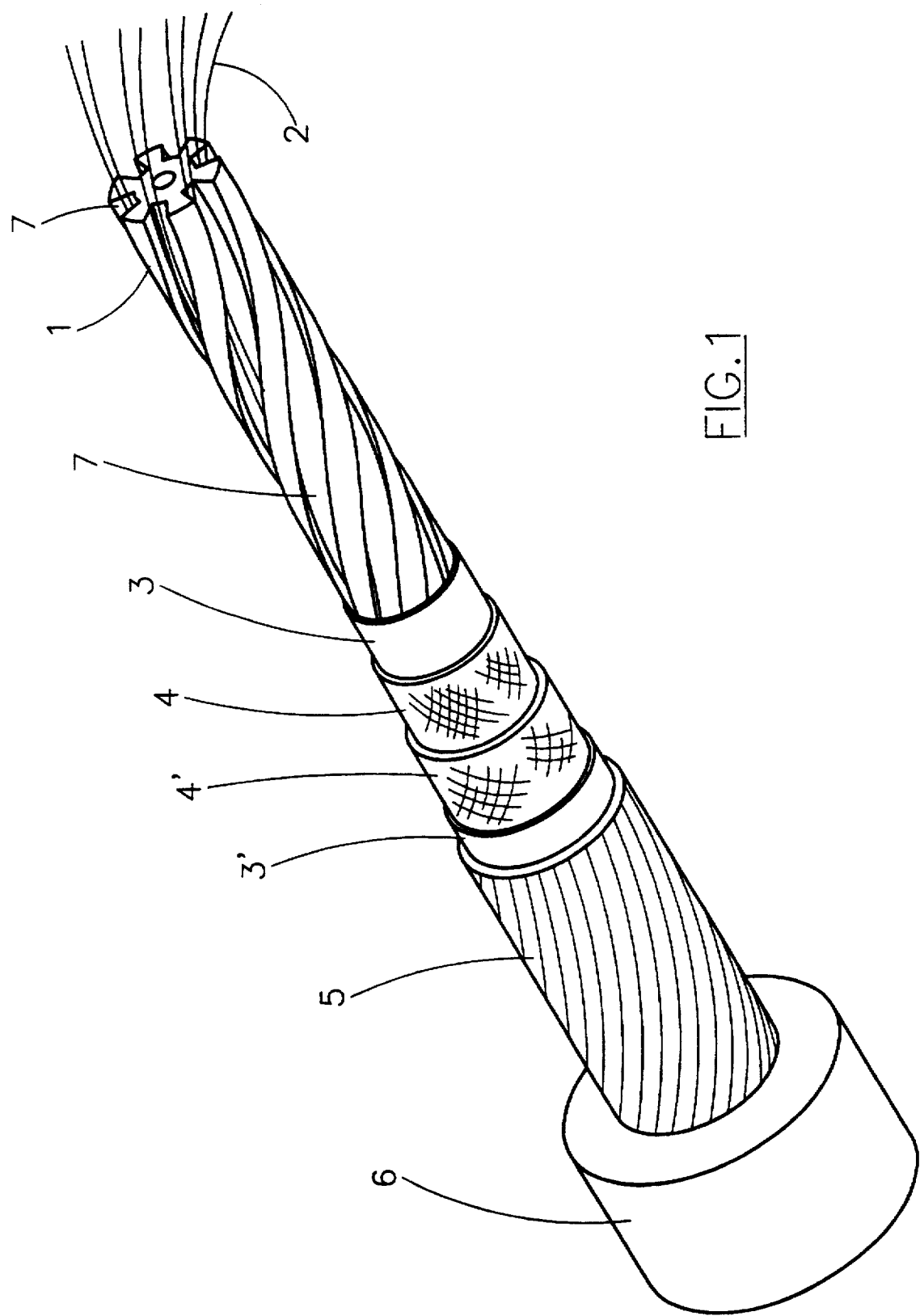
FIG. 1 is a perspective view of a cable according to a first embodiment of this invention wherein the first longitudinal housing consists of grooves in a core of polymeric material.

More particularly, the cable of FIG. 1 consists of a core 1 provided with helical cavities 7 that house the optical fibers 2. Said core 1 is wound with a layer 3 of tape of a material impenetrable to the composition of this invention, preferably polyester, and with two layers 4 and 4' of tape of non-woven fabric impregnated by the composition of this invention. Typically, the amount of composition of the invention that impregnates the tape of non-woven fabric is of 4–5 g/m, an amount that has been shown to be adequate in the case of the embodiment of FIG. 1. There then follow another layer 3' of polyester tape, a winding 5 of threads of Kevlar™ and, lastly, a polythene sheath 6.

Figure 2:
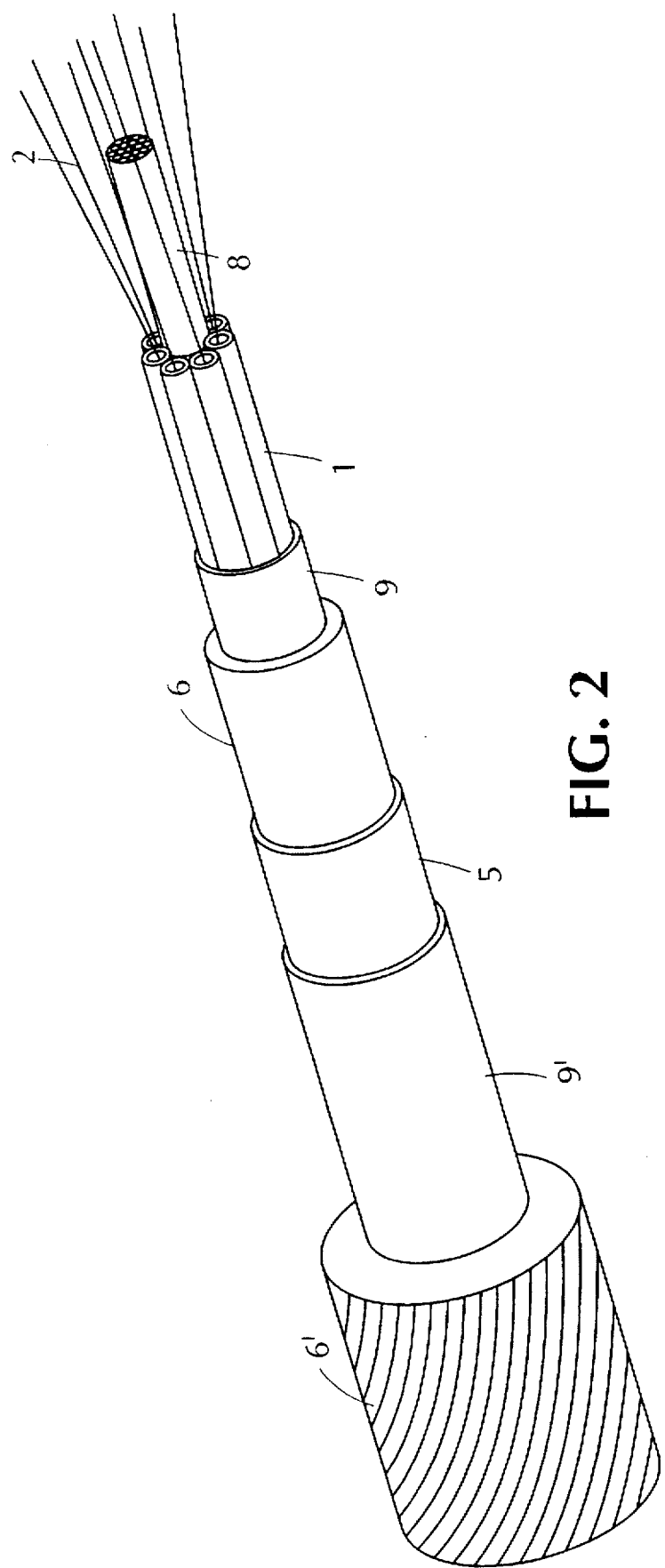
FIG. 2 is a side view of a cable according to a second embodiment of this invention wherein the longitudinal housing consists of small tubes of polymeric material.

In its turn, the cable of FIG. 2 comprises a dielectric axial element 8, for example in plastic reinforced by fiber glass. Around said element 3 there extends a helical bundle of small tubes 1 that house the optical fibers 2. Said bundle of small tubes 1 is wound with a layer of tape 9 of polyethylene. In this embodiment, the composition of this invention is preferably housed in the space located between said axial element 8, the small tubes 1 and said layer 9 of polyethylene. There then follow a sheath of polyethylene 6, a winding 5 of threads of Kevlar™, another winding of tape 9' of polyethylene and, lastly, another sheath of polyethylene 6'. In this case again the space used for housing the filler is sufficient to contain an amount of composition of the invention adequate to ensure the required protection.

The following examples illustrate this invention without, however, limiting it in any way.

EXAMPLE 1

47.85 parts by weight of polyisobutylene having a molecular weight average number of 800, 0.5 parts by weight of polybutadiene having a molecular weight average number of from 1,500 to 2,000 (by Revertex), 1.5 parts by weight of pyrogenic silica (by Cabot) having an average particle size of 0.007 micron, 50 parts by weight of sodium polyacrylate (J550 by Sanyo) ground to a size of or less than 50 micron, and 0.15 parts by weight of 5% palladium on activated charcoal (by Chimet) were mixed together thoroughly with a baffle dispersor until a homogeneous dispersion was obtained.

The paste-like and thyxotropic dispersion thus obtained was refined with a three-cylinder refiner.

EXAMPLE 2

The preparation was carried out as shown in Example 1, except that 47.85 parts by weight of polyisobutylene having a molecular weight average number of 800 were replaced by 47.35 parts by weight of polyisobutylene having a molecular weight average number of 610 and 1.5 parts by weight of pyrogenic silica have been increased to 2 parts.

EXAMPLE 3

The dispersion of Example 1 has been prepared on large scale by mixing for 2 hours, in an Agitomic™ machine (by Pinto, Milan), 47.85 kg of polyisobutylene, 0.5 kg of polybutadiene, 1.5 kg of pyrogenic silica, 50 kg of sodium polyacrylate and 0.15 kg of 5% palladium on activated charcoal.

The preparation was then completed by making the paste-like and thyxotropic dispersion thus obtained pass in a homogenizer and then in a degasifier consisting of two drilled disks placed close to one another and operating as a bubble breaker.

EXAMPLE 4

47.25 parts by weight of vinyl-terminated polydimethyl siloxane (by Bayer), 2.65 parts by weight of pyrogenic silica (by Cabot) having an average particle size of 0.007 micron, 50 parts by weight of sodium polyacrylate (J550 by Sanyo) and 0.125 parts by weight of palladium on activated charcoal (by Chimet) were mixed together thoroughly with a baffle dispersor until a homogeneous dispersion was obtained.

The paste-like and thyxotropic dispersion thus obtained was refined with a three-cylinder refiner.

EXAMPLE 5

48.25 parts by weight of non-vinyl-terminated polydimethyl siloxane (by Bayer) whose viscosity is 5,000 centistokes, 1.75 parts by weight of pyrogenic silica (by Cabot) having an average particle size of 0.007 micron and 50 parts by weight of sodium polyacrylate (J550 by Sanyo) were mixed together thoroughly with a baffle dispersor until a homogeneous dispersion was obtained.

The paste-like and thyxotropic dispersion thus obtained was refined with a three-cylinder refiner.

COMPARATIVE COMPOSITION 1

Viledon tape K 1415 0.2 mm thick (by Freudenberg) consisting of a tape of non-woven fabric of heat-welded polyester fiber containing an amount of sodium polyacrylate equal to 50% by weight with respect to the total weight of tape.

COMPARATIVE COMPOSITION 2

62.2 parts parts by weight of polyisobutylene having a molecular weight average number of 800, 0.65 parts by weight of polybutadiene having a molecular weight average number of from 1,500 to 2,000 (by Revertex), 1.95 parts by weight of pyrogenic silica (by Cabot) having an average particle size of 0.007 micron, 35 parts by weight of sodium polyacrylate (J550 by Sanyo) and 0.20 parts by weight of 5% palladium on activated charcoal (by Chimet) were mixed together thoroughly with a baffle dispersor until a homogeneous dispersion was obtained.

The paste-like and thyxotropic dispersion thus obtained was refined with a three-cylinder refiner.

COMPARATIVE COMPOSITION 3

76.56 parts parts by weight of polyisobutylene having a molecular weight average number of 800, 0.8 parts by weight of polybutadiene having a molecular weight average number of from 1,500 to 2,000 (by Revertex), 2.4 parts by weight of pyrogenic silica (by Cabot) having an average particle size of 0.007 micron, 20 parts by weight of sodium polyacrylate (J550 by Sanyo) and 0.24 parts by weight of 5% palladium on activated charcoal (by Chimet) were mixed together thoroughly with a baffle dispersor until a homogeneous dispersion was obtained.

The paste-like and thyxotropic dispersion thus obtained was refined with a three-cylinder refiner.

COMPARATIVE COMPOSITION 4

86.13 parts parts by weight of polyisobutylene having a molecular weight average number of 800, 0.9 parts by weight of polybutadiene having a molecular weight average number of from 1,500 to 2,000 (by Revertex), 2.7 parts by weight of pyrogenic silica (by Cabot) having an average particle size of 0.007 micron, 10 parts by weight of sodium polyacrylate (J550 by Sanyo) and 0.27 parts by weight of 5% palladium on activated charcoal (by Chimet) were mixed together thoroughly with a baffle dispersor until a homogeneous dispersion was obtained.

The paste-like and thyxotropic dispersion thus obtained was refined with a three-cylinder refiner.

TEST I: Permeability to Vapour

Permeability to water vapour was tested according to the ASTM E96 1972 except that, instead of a hygroscopic mixture, a capacitative sensor of relative humidity (2 mV=about 1% RH) was placed in the metal container. The upper portion of the container was closed with filter paper and on the latter a continuous and uniform layer (about 3 mm) of the sample under examination was spread.

The container was then placed in a chamber wherein the temperature and the relative humidity level could be adjusted.

The permeability of the materials shown below was tested at 25° C. and at RH=100%.

Materials:
- layer (about 1 mm thick) consisting of five superimposed strips of Viledon K 1415 tape (Comparative Composition 1);
- 3 mm layer of the composition of Example 3 (Composition of the Invention);
- 3 mm layer of the composition of Example 5 (Composition of the Invention);
- 3 mm layer of the Comparative Composition 2;

3 mm layer of the Comparative Composition 3;

3 mm layer of the Comparative Composition 4;

film of Low Density Poly Ethylene (LDPE) 1 mm thick (Possible Outer Coating);

film of Medium Density Poly Ethylene (MDPE) 1 mm thick (Possible Outer Coating);

film of High Density Poly Ethylene (HDPE) 1 mm thick (Possible Outer Coating);

The time necessary for the RH level inside the measurement container to reach 63% was checked (time constant defined as the time necessary to reach a 1/e value equal to 100%; e=2.71).

The results were:

6 hours for the Viledon K 1415 tape (Comparative Composition 1);

more than 1200 hours for the Compositions of Example 3 and 5.

When the test was discontinued at the end of the 1200-hour period, the relative humidity level inside the measurement container had not yet exceeded 50%;

350 hours for the Comparative Composition 2;

450 hours for the Comparative Composition 3;

475 hours for the Comparative Composition 4;

80 hours for the LDPE film;

190 hours for the MDPE film;

750 hours for the HDPE film.

As can be appreciated from the above results, the Compositions of Examples 3 and 5 cause a substantial delay in the contact with the optical fibers of the water vapour that penetrates through the outer coating.

Comparative Composition 1 does not help in delaying the contact with the optical fibers of the water vapour that penetrates through the outer coating made of LDPE.

Comparative Compositions 2, 3 and 4 are of better help than that of Comparative Composition 1 but the dramatic reduction in the permeability observed when Component B is changed from 35% to 50% is surprising.

TEST II: Vapour Absorbing Ability

1. Composition of Example 3

4 layers each of 1 mm of a Composition of the Invention, prepared as disclosed in Example 3 and that had never been exposed to humidity, were weighed and placed in four chambers under controlled temperature and humidity. During the experiment, their weight was checked at predetermined time intervals.

The conditions of the first chamber were: T=25° C., RH=50%. Under these conditions the sample under examination absorbed 13% (w/w) of humidity in 20 days and 15% (w/w) in 40 days.

The conditions of the second chamber were: T=5° C., RH=90%. Under these conditions the sample under examination absorbed 20% (w/w) of humidity in 10 days, 35% (w/w) in 20 days and 43% (w/w) in 31 days.

The conditions of the third chamber were: T=25° C., RH=90%. Under these conditions the sample under examination absorbed 20% (w/w) of humidity in 3 days, 40% (w/w) in 8 days and 44% (w/w) in 20 days.

The conditions of the fourth chamber were: T=60° C., RH=90%. Under these conditions the sample under examination absorbed 45% (w/w) of humidity in 1 day and 54% (w/w) in 5 days.

The test was also carried out on 5 layers of the Composition of Example 3 that were 5 mm thick.

The conditions of the first chamber were: T=60° C., RH=25%. Under these conditions the sample under examination absorbed 2% (w/w) of humidity in 20 days, 4% (w/w) in 40 days and 6% (w/w) in 60 days.

The conditions of the second chamber were: T=5° C., RH=90%. Under these conditions the sample under examination absorbed 8% (w/w) of humidity in 20 days and 12% (w/w) in 30 days.

The conditions of the third chamber were: T=25° C., RH=90%. Under these conditions the sample under examination absorbed 20% (w/w) of humidity in 10 days, 40% (w/w) in 24 days and 45% (w/w) in 36 days.

The conditions of the fourth chamber were: T=60° C., RH=90%. Under these conditions the sample under examination absorbed 20% (w/w) of humidity in 3 days, 52% in 22 days and 53% (w/w) in 49 days.

The conditions of the fifth chamber were: T=60° C., RH=100%. Under these conditions the sample under examination absorbed 78% (w/w) of humidity in 20 days, 80% in 40 days and 80% (w/w) in 48 days.

Lastly, the test was also carried out on a layer of the Composition of Example 3 that was 15 mm thick.

The conditions of the chamber were: T=20° C., RH=100%. Under these conditions the sample under examination absorbed 7% (w/w) of humidity in 20 days, 16% (w/w) in 40 days, 27% (w/w) in 80 days and 28.6% (w/w) in 85 days.

2. Comparative Composition b 1

The test was also carried out on a layer of Comparative Composition 1 that was 0.2 mm thick.

The conditions of the chamber were: T=60° C., RH=90%.

Under these conditions the sample under examination absorbed 17.4% (w/w) of humidity in 5 days.

3. Comparative Compositions 2, 3 and 4

1 layer 5 mm thick of each of Comparative Compositions 2, 3 and 4 and of the Composition of Example 3, never exposed to humidity, was weighed and placed in a chamber at 25° C. and at a RH of 90% for 50 days.

Under these conditions:

the Composition of Example 3 absorbed about 70% (w/w) of humidity;

Comparative Composition 2 absorbed about 33% (w/w) of humidity;

Comparative Composition 3 absorbed about 10% (w/w) of humidity;

Comparative Composition 4 absorbed about a little less than 2% (w/w) of humidity.

TEST III: Retention Ability

The ability to retain absorbed water has been evaluated on three of the samples that underwent the absorption test according to the previous Test II.

More precisely, they were the 5 mm thick sample of the Composition of Example 3 that underwent the absorption test at 60° C. and RH 100%, the 15 mm thick sample of the Composition of Example 3 that underwent the absorption test at 20° C. and RH 100%, and the sample of Comparative Compound 1.

Their retention ability was tested by placing the samples under examination in a cell under controlled temperature and humidity (T=60° C., RH less than 5%). During the experiment, their weight was checked at predetermined time intervals.

The 5 mm thick sample of the Composition of Example 3 lost about 2% per hour.

The 15 mm thick sample of the Composition of Example 3 lost a little less than 1% per hour.

The sample of Comparative Compound 1 lost 6% per hour.

The drying speed of the Composition of Example 3 shows that, in the daily day/night cycle, water released by the Composition of this invention during the warm hours contributes only a few percentage points to the relative humidity of the cable and it is not in any case such as to allow critical values (75–80%) to be reached until the Composition has not been saturated.

In contrast, in the case of Comparative Compound 1, the drying speed is much higher and the water released during the warm hours increases significantly the relative humidity inside the cable and brings it easily to the abovementioned critical values.

TEST IV: Compression Module

When it absorbs water, the Composition of this invention undergoes a hardening that makes it substantially impenetrable to liquid water and that, moreover, prevents the diffusion of water vapour inside the cable.

The amount of hardening caused by water has been tested with a thermo-mechanical analyser (TMA) model METTLER TA 2,000. The compression force applied during the check was 2,300 MPa and the frequency was 0.1 Hz. The check was carried out on small disks of the compositions under examination (3 mm thick) after absorption of 35% (w/w) and 55% (w/w) of water.

The results are shown in the following Table I.

TABLE I

| Compression Module (MPa) | | | |
|---|---|---|---|
| Product of the Example | Initial | 35% | 55% |
| 2 | <0.01 | 0.290 | 0.200 |
| 3 | <0.01 | 0.197 | 0.181 |
| 4 | <0.01 | 0.192 | 0.092 |
| 5 | <0.01 | 0.181 | 0.096 |

As can be seen from the values of the compression module given in Table I, the Compositions of Examples 4 and 5, that were hardened when they had absorbed 35% of water, then became a gel with the increase of the absorbed water. The consistency of said gel, however, was sufficient to oppose the diffusion of water in the cable.

In contrast, hardening of Compositions of Examples 2 and 3 persists even at high values of absorbed water.

TEST V: Delamination of the Primary Coating

The tests were carried out on samples of cable 0.3 m long whose outer coating was made of a 1 mm thick sheath of polyurethane (PUR) or medium density polyethylene (MDPE) having a time constant for the permeation of vapour (Test I) of 8 and 190 hours, respectively. In addition, the longitudinal housings of the optical fibers were small tubes 0.2 mm thick of polybutene terephthalate (PBT) having a time constant for the permeation of vapour (Test I) of 75 hours.

In their turn, the primary coating of the fibre was consisting of a layer (about 30 micron) of acrylate 950/030 by DSM while the secondary coating was consisting of a layer (about 30 micron) of acrylate 950/044 by DSM. The respective time constants for the permeation of vapour (Test I) were 8 and 12 hours.

The longitudinal housings of the optical fibers had been coated (15 g/m) with a composition of this invention or with a of comparative composition. The comparative composition (CC) was consisting of NAPTEL™ 851, petroleum jelly by British Petroleum.

The ends of the longitudinal housings of the optical fibers had been sealed with "schnell Klebstoffx60" by Hottinger-Baldwin. In their turn, the ends of the cable samples had been sealed with heat-shrinkable caps by Raychem.

Said cable samples were placed in a water tank kept at 60° C. A sample of each type was extracted from the tank and opened at predetermined time intervals to check for the possible presence of delaminations of the primary coating of the fibers. The delamination check was carried out by examination under an optical microscope at 160 magnifications, in transmitted light, of the optical fiber immersed in Canada balsam. For each sample the amount of water absorbed was also checked by weighing.

The results obtained are given in Table II.

TABLE II

| Delamination of the Primary Coating of the Optical Fibers | | | | |
|---|---|---|---|---|
| Time days | Composition | Outer Coating | Absorbed water (g/m) | Delamination |
| 2 | Example 3 | PUR | 2.25 | NO |
| 2 | CC | PUR | 0.00 | YES |
| 30 | Example 3 | PUR | 6.90 | NO |
| 30 | Example 4 | PUR | 7.20 | NO |
| 30 | CC | PUR | 0.00 | YES |
| 120 | Example 3 | MDPE | 0.15 | NO |
| 120 | CC | MDPE | 0.00 | YES |

In a similar manner an assessment was made of the delamination of the primary coating of the optical fibers in 7 cable samples like those disclosed above except that the first 3 samples had been protected with 18 g/m of Comparative Composition 1 (hereinafter referred to as type A samples), another 2 samples had been protected with 45–50 g/m of the Composition of Comparative Example 2 (hereinafter referred to as type B samples), and another 2 samples had been protected with 45–50 g/m of the Composition of the invention prepared according to Example 3 (hereinafter referred to as type C samples).

The first type A cable sample was opened after 7 days and it was observed that the water absorbed was 5.5 g/m and that the primary coating of the optical fibers was beginning to become separated on all the fibers.

The second type A cable sample was opened after 15 days and it was observed that the water absorbed by the fibers was 7.1 g/m and that the primary coating of the optical fibers exhibited widespread separations on all the optical fibers.

The third type A cable sample was opened after 30 days and it was observed that the water absorbed was 8.4 g/m and that the primary coating of the optical fibers exhibited separations greater than 100 micron on all the optical fibers.

The first type B cable sample was opened after 15 days and it was observed that the water absorbed by the fibers was 13.4 g/m and that the primary coating of the optical fibers exhibited small separations on all the optical fibers.

The second type B cable sample was opened after 30 days and it was observed that the water absorbed by the fibers was 21 g/m and that the primary coating of the optical fibers exhibited small separations on all the optical fibers.

The first type C cable sample was opened after 15 days and it was observed that the water absorbed by the fibers was 17.6 g/m and that the primary coating of the optical fibers did not exhibit any separation on all the optical fibers.

The second type C cable sample was opened after 30 days and it was observed that the water absorbed by the fibers was 25.5 g/m and that the primary coating of the optical fibers did not exhibit any separation on all the optical fibers.

TEST VI: Ability to Absorb Hydrogen Gas

The ability to absorb hydrogen gas was tested with the device and the method disclosed in the European patent applications EP-A-0 466 230 and 0 464 918.

The evaluation was carried out on the Composition of Example 3 and the result was that it absorbs 2.38 ml(stp)/g in 24 days; "stp" means "standard temperature pressure".

It has been proved that the hardening of the Composition of the invention, caused by the absorption of water, does not jeopardize its ability to absorb hydrogen gas as well.

We claim:

1. An optical cable, comprising (a) at least a first closed longitudinal housing containing at least an optical fiber and (b) an outer coating around the first housing and permeable to water, characterized in that it comprises a second longitudinal housing around the first housing intermediate said outer coating and said first housing and including therewithin a moisture-absorbing composition that after absorption of more than 50% by weight of water releases less than 5% by weight of water at 60° C. in two hours, the first housing being impermeable by the moisture-absorbing composition.

2. A cable according to claim 1, characterized in that said moisture-absorbing composition comprises from 45 to 60% by weight of a fluid hydrophobic compound (Component A) and from 40 to 55% of a moisture-absorbing compound (Component B).

3. A cable according to claim 2, characterized in that, when Component A is unsaturated, said moisture-absorbing composition also comprises a catalyst (Component D) capable of promoting the absorption of hydrogen gas by Component A.

4. A cable according to claim 3, characterized in that Component D is a derivative of a noble metal.

5. A cable according to claim 4, characterized in that Component D consists of palladium metal on activated charcoal.

6. A cable according to claim 2, characterized in that Component A is selected from the group comprising saturated and unsaturated polyolefins having a molecular weight average number of from 200 to 3,000, saturated and unsaturated polysiloxanes having a molecular weight average number of from 1,000 to 10,000, polyhydric alcohols, aliphatic, aromatic and naphthenic hydrocarbon oils whose viscosity is of from 50 to 30,000 centistokes, liquid esters such as dioctyl phthalate, liquid polyesters, and animal and vegetable oils.

7. A cable according to claim 6, characterized in that Component A is a polyisobutylene having a molecular weight of from 300 to 2,000, a polybutadiene or an optionally vinyl-terminated polydimethylsiloxane.

8. A cable according to claims 1 or 2, characterized in that said moisture-absorbing composition also comprises a thickening agent (Component C).

9. A cable according to claim 8, characterized in that Component C is a pyrogenic silica.

10. A cable according to claim 2, characterized in that Component B is a sodium polyacrylate or polymethacrylate.

11. A moisture-absorbing composition characterized in that said composition after absorption of more than 50% by weight of water releases less than 5% by weight of water at 60° C. in two hours and it comprises from 45 to 60% by weight of a fluid hydrophobic compound (Component A) and from 40 to 55% of a moisture-absorbing compound (Component B).

12. A moisture-absorbing composition according to claim 11, characterized in that, when Component A is unsaturated, said composition also comprises a catalyst (Component D) capable of promoting the absorption of hydrogen gas by Component A.

13. A moisture-absorbing composition according to claim 12, characterized in that Component D is a derivative of a noble metal.

14. A moisture-absorbing composition according to claim 13, characterized in that Component D consists of palladium metal on activated charcoal.

15. A moisture-absorbing composition according to claim 11, characterized in that it also comprises a thickening agent (Component C).

16. A moisture-absorbing composition according to claim 15, characterized in that Component C is a pyrogenic silica.

17. A moisture-absorbing composition according to claim 11, characterized in that Component A is selected from the group comprising saturated and unsaturated polyolefins having a molecular weight average number of from 200 to 3,000, saturated and unsaturated polysiloxanes having a molecular weight average number of from 1,000 to 10,000, polyhydric alcohols, aliphatic, aromatic and naphthenic hydrocarbon oils whose viscosity is of from 50 to 30,000 centistokes, liquid esters such as dioctyl phthalate, liquid polyesters and animal and vegetable oils.

18. A moisture-absorbing composition according to claim 17, characterized in that Component A is a polyisobutylene having a molecular weight of from 300 to 2,000, a polybutadiene or an optionally vinyl-terminated polydimethyl siloxane.

19. A moisture-absorbing composition according to claim 11, characterized in that Component B is a sodium polyacrylate or polymethacrylate.

20. A moisture-absorbing composition characterized in that said composition after absorption of more than 50% by weight of water releases less than 5% by weight of water at 60° C. in two hours, wherein the composition comprises from 45 to 60% by weight of a fluid hydrophobic compound (Component A) and from 40 to 55% of a moisture-absorbing compound (Component B) and wherein Component A is selected from the group comprising saturated and unsaturated polyolefins having a molecular weight average number of from 200 to 3,000, saturated and unsaturated polysiloxanes having a molecular weight average number of from 1,000 to 10,000, polyhydric alcohols, aliphatic, aromatic and naphthenic hydrocarbon coils whose viscosity is of from 50 to 30,000 centistokes, liquid esters such as dioctyl phthalate, liquid polyesters and animal and vegetable oils.

21. A moisture-absorbing composition according to claim 20, characterized in that Component A is a polyisobutylene having a molecular weight of from 300 to 2,000, a polybutadiene or an optionally vinyl-terminated polydimethyl siloxane.

22. An optical cable, comprising (a) at least a first closed longitudinal housing containing at least an optical fiber and (b) an outer coating permeable to water, characterized in that it comprises a second longitudinal housing comprising a moisture-absorbing composition that after absorption of more than 50% by weight of water releases less than 5% by weight of water at 60° C. in two hours, wherein said moisture-absorbing composition comprises from 45% to 60% by weight of a fluid hydrophobic compound (Component A) and from 40 to 55% of a moisture-absorbing compound (Component B) and wherein Component A is selected from the group comprising saturated and unsaturated polyolefins having a molecular weight average number of from 200 to 3,000, saturated and unsaturated polysiloxanes having a molecular weight average number of from 1,000 to 10,000, polyhydric alcohols, aliphatic, aromatic and naphthenic hydrocarbon oils whose viscosity is of from 50 to 30,000 centistokes, liquid esters such as dioctyl phthalate, liquid polyesters, and animal and vegetable oils.

23. A cable according to claim 22, characterized in that Component A is a polyisobutylene having a molecular weight of from 300 to 2,000, a polybutadiene or an optionally vinyl-terminated polydimethylsiloxane.

* * * * *

UNITED STATES PATENT AND TRADEMARK OFFICE
CERTIFICATE OF CORRECTION

PATENT NO.   : 5,715,343
DATED        : Feb. 3, 1998
INVENTOR(S)  : Anelli et al It is certified that error appears in the above-indentified patent and that said Letters Patent is hereby corrected as shown below:

Col. 1, line 47, change "333 . 338" to --333-338--;

Col. 8, line 29, cancel "b";

Col. 10, line 7, cancel "of";

Col. 11, line 63, change "1 or 2" to --1 or 3--;

Col. 12, line 39, change "polydimethyl" to --poly dimethyl--;

Col. 12, line 63, change "polydimethyl" to --poly dimethyl--.

Signed and Sealed this

Twenty-fifth Day of August, 1998

Attest:

BRUCE LEHMAN

*Attesting Officer*      *Commissioner of Patents and Trademarks*